US012580342B2

(12) United States Patent
Yang

(10) Patent No.: US 12,580,342 B2
(45) Date of Patent: Mar. 17, 2026

(54) CONNECTOR ASSEMBLY

(71) Applicant: Molex, LLC, Lisle, IL (US)

(72) Inventor: Che-Yuan Yang, New Taipei City (TW)

(73) Assignee: Molex, LLC, Lisle, IL (US)

( * ) Notice: Subject to any disclaimer, the term of this patent is extended or adjusted under 35 U.S.C. 154(b) by 414 days.

(21) Appl. No.: 18/077,241

(22) Filed: Dec. 8, 2022

(65) Prior Publication Data

US 2023/0187872 A1 Jun. 15, 2023

(30) Foreign Application Priority Data

Dec. 9, 2021 (CN) ........................ 202111498944.2

(51) Int. Cl.

*H01R 13/518* (2006.01)
*H01R 12/58* (2011.01)
*H01R 13/659* (2011.01)

(52) U.S. Cl.

CPC ........... *H01R 13/518* (2013.01); *H01R 12/58* (2013.01); *H01R 13/659* (2013.01)

(58) Field of Classification Search

CPC .... H01R 13/518; H01R 12/58; H01R 13/659; H01R 13/5812; H01R 13/6593; H01R 13/6658; H01R 13/502; H01R 13/648

See application file for complete search history.

(56) References Cited

U.S. PATENT DOCUMENTS

| | | | | |
|---|---|---|---|---|
| 5,147,215 A * | 9/1992 | Pritulsky | ................ | H01R 24/62 439/406 |
| 5,639,262 A | 6/1997 | Lim | | |
| 5,788,529 A * | 8/1998 | Borzi | .................. | H01R 9/2458 29/830 |
| 6,558,191 B2 * | 5/2003 | Bright | .................. | G02B 6/4246 439/541.5 |
| 6,600,865 B2 * | 7/2003 | Hwang | ................ | H01R 13/659 439/541.5 |
| 6,972,968 B2 * | 12/2005 | Hwang | ................ | H05K 9/0058 174/383 |

(Continued)

FOREIGN PATENT DOCUMENTS

| | | |
|---|---|---|
| CN | 1985414 A | 6/2007 |
| CN | 200962472 Y | 10/2007 |

(Continued)

*Primary Examiner* — Truc T Nguyen

(57) ABSTRACT

A connector assembly includes a shielding cover and a socket connector. The shielding cover includes a cover body, a compartment frame disposed at the cover body, and two insertion channels jointly defined by the cover body and the compartment frame and separated by the compartment frame in an up-down direction. The socket connector is disposed at a rear segment of the shielding cover, and includes two socket housings arranged in the up-down direction and respectively disposed at the two insertion channels, and a plurality of socket terminals. The compartment frame has a support structure located at a rear segment and providing support between the two socket housings. The support structure includes an upper support plate, a lower support plate, and a support block disposed between the upper support plate and the lower support plate.

15 Claims, 15 Drawing Sheets

(56) References Cited

U.S. PATENT DOCUMENTS

| | | | | |
|---|---|---|---|---|
| 7,371,965 | B2 * | 5/2008 | Ice | G02B 6/4269 174/548 |
| 9,518,785 | B2 * | 12/2016 | Szczesny | G02B 6/4269 |
| 11,848,523 | B2 * | 12/2023 | Yang | H01R 13/6585 |
| 2005/0013115 | A1 * | 1/2005 | Hwang | G02B 6/4267 361/690 |
| 2005/0013126 | A1 * | 1/2005 | Hwang | H05K 9/002 361/818 |
| 2011/0318956 | A1 * | 12/2011 | Long | H01R 13/658 439/490 |
| 2016/0062065 | A1 * | 3/2016 | Wu | G02B 6/4277 385/89 |
| 2017/0077643 | A1 * | 3/2017 | Zbinden | G02B 6/4268 |
| 2021/0194173 | A1 | 6/2021 | Yang | |
| 2023/0170650 | A1 * | 6/2023 | Lu | H01R 13/6582 439/607.01 |

FOREIGN PATENT DOCUMENTS

| | | | |
|---|---|---|---|
| CN | 101669256 | B | 1/2013 |
| CN | 103094764 | A | 5/2013 |
| CN | 204257893 | U | 4/2015 |
| CN | 105720402 | A | 6/2016 |
| CN | 207266479 | U | 4/2018 |
| CN | 106990488 | B | 2/2019 |
| CN | 208580888 | U | 3/2019 |
| CN | 110829064 | A | 2/2020 |
| CN | 212033281 | U | 11/2020 |
| TW | 392380 | | 6/2000 |
| TW | M596469 | U | 6/2020 |
| TW | I733519 | B | 7/2021 |
| TW | 202131555 | A | 8/2021 |
| TW | 202139541 | A | 10/2021 |

* cited by examiner

CONNECTOR ASSEMBLY

RELATED APPLICATIONS

This application claims priority to Chinese Patent Application Serial No. 202111498944.2, filed Dec. 9, 2021, which is incorporated herein by reference in its entirety.

TECHNICAL FIELD

The present invention relates to a connector, and particularly relates to a connector assembly.

BACKGROUND

The Chinese utility model patent having publication No. CN204257893U discloses an electrical connector. An insulating body of the electrical connector is provided with a first insertion port and a second insertion port, and a recessed engagement cavity located between the first insertion port and the second insertion port. The engagement cavity is for an engagement protruding portion of a metal heat dissipation block to be inserted and positioned therein. The engagement protruding portion of the metal heat dissipation block extends backward from a main body portion to be inserted and positioned in the engagement cavity of the insulating body. A partition plate is provided with insertion portions extending backward and located on upper and lower sides of the engagement protruding portion of the metal heat dissipation block, and the insertion portions are inserted into the insulating body. In this way, the partition plate and the metal heat dissipation block in the partition plate can be stably held on a side wall of a metal housing and the insulating body. However, this application discloses how to use the insulating body to position the metal heat dissipation block and the partition plate, but does not disclose a support structure for supporting an upper connector and a lower connector (of the insulating body).

The Chinese invention patent having publication No. CN110829064A discloses an electrical connector. A rear side of the electrical connector is provided with a fixing cover used to fix cables and fastened to a circuit board. The fixing cover includes a plate-shaped portion and a fastening portion disposed on a rear side of the plate-shaped portion. The plate-shaped portion is provided with several wire passing holes, and the cables pass through the wire passing holes and are then welded to conductive terminals of the electrical connector. However, the cable disclosed in this application must pass through the wire passing hole of the fixing cover in advance when at least one end thereof has not been connected to the connector. If both ends of the cable have already been connected, then the fixing cover cannot be installed. Secondly, the cables have to pass through the wire passing holes of the fixing cover one by one individually, and consequently, operation is laborious and time-consuming. Besides, the wire passing holes are through-holes directly formed in the metal fixing cover by stamping, and edges of these holes are sharp, and therefore the cables are easily scratched and even broken.

SUMMARY

Thus, an objective of the present invention is to provide a connector assembly that can solve at least one of the problems in the prior art.

In some embodiments, a connector assembly of the present invention comprises a shielding cover, and a socket connector. The shielding cover comprises a cover body, a compartment frame disposed at the cover body, and two insertion channels jointly defined by the cover body and the compartment frame and separated by the compartment frame in an up-down direction. The socket connector is disposed at a rear segment of the shielding cover, and comprises two socket housings arranged in the up-down direction and respectively disposed at the two insertion channels, and a plurality of socket terminals. The compartment frame has a support structure located at a rear segment and providing support between the two socket housings. The support structure comprises an upper support plate, a lower support plate, and a support block disposed between the upper support plate and the lower support plate.

In some embodiments, the compartment frame has an intermediate recess located at the rear segment and extending in a front-rear direction, and two of the support structures separated by the intermediate recess in a left-right direction, the socket connector further comprises an intermediate housing disposed between the two socket housings and at least partially accommodated in the intermediate recess, the two socket housings and the intermediate housing jointly define two channels located on left and right sides of the intermediate housing, and the two support structures of the compartment frame are located at the two channels respectively.

In some embodiments, each of the upper support plate and the lower support plate has a plurality of positioning protrusions located around the support block and used to position the support block.

In some embodiments, the connector assembly further comprises a bolt passing through the two socket housings of the socket connector and the support structure.

In some embodiments, the bolt has a tail portion fixed to a circuit substrate.

In some embodiments, the bolt is connected to a ground component of the socket connector and a ground line of the circuit substrate.

In some embodiments, a connector assembly of the present invention comprises a shielding cover, a socket connector, a rear cover, and a wire organizer. The shielding cover comprises an insertion channel having a rear opening. The socket connector is disposed at a rear segment of the shielding cover and comprises a socket housing, a plurality of socket terminals, and a plurality of cables respectively connected to at least part of the plurality of socket terminals and extending backward out of the rear opening. The rear cover is installed at the rear opening of the shielding cover, the rear cover comprises a rear wall, and the rear wall has a wire organizer installation portion. The wire organizer is installed at the wire organizer installation portion of the rear wall, the wire organizer has wire organizing holes, and the plurality of cables of the socket connector extend through the plurality of wire organizing holes of the wire organizer backward.

In some embodiments, the wire organizer has two half portions combined with each other.

In some embodiments, the two half portions of the wire organizer have the same configuration and are combinable with each other.

In some embodiments, the wire organizer installation portion comprises a recess integrally formed at the rear wall, and the wire organizer is installed within the recess.

In some embodiments, each of the half portions has a slot formed at a periphery thereof and correspondingly accommodating an edge of the recess.

In some embodiments, each of the half portions has combination protruding portions and combination recessed portions complementary to each other.

In some embodiments, the wire organizer installation portion comprises two of the recesses integrally formed at the rear wall and arranged side by side with each other, and a spacer member located between the two recesses, each of the half portions has two side portions respectively installed within the two recesses, and a spacer portion located between the two side portions and having a through-slot, and the spacer member is inserted in the through-slots of the spacer portions of the two half portions.

In some embodiments, each of the half portions has the plurality of combination protruding portions and the plurality of combination recessed portions formed on the side portions and the spacer portion.

In some embodiments, the connector assembly comprises two of the wire organizers, the rear wall has two of the wire organizer installation portions respectively located above and below and respectively having one of the wire organizers installed thereon, each of the recesses of the wire organizer installation portion located above has an upward-facing opening and each of the recesses of the wire organizer installation portion located below has a downward-facing opening.

The support structure of the compartment frame in the present invention provides support between the two socket housings, and comprises the support block disposed between the upper support plate and the lower support plate, thereby providing solid and strong support between the two socket housings. Secondly, the bolt passing through the two socket housings and the support structure can further maintain the relative position between the two socket housings and the support structure, so as to increase the support strength of the support structure, and the bolt can further serve as a component for grounding. In addition, the wire organizers installed on the rear cover allow the plurality of cables to come out from behind, and realizes wire organizing and positioning functions. Also, the wire organizer formed by combining the two half portions can be separately and easily installed onto the rear cover when the cables are in an assembled state. In addition, the wire organizer can be made of an insulating material, so that the edges of the wire organizing holes of the wire organizer are not as sharp as the rear cover, thereby protecting the cables coming out of the rear cover from being scratched.

BRIEF DESCRIPTION OF THE DRAWINGS

Other features and effects of the present invention will be clearly presented in the embodiments with reference to the accompanying drawings, wherein.

DETAILED DESCRIPTION OF THE PREFERRED EMBODIMENTS

Figure 1:
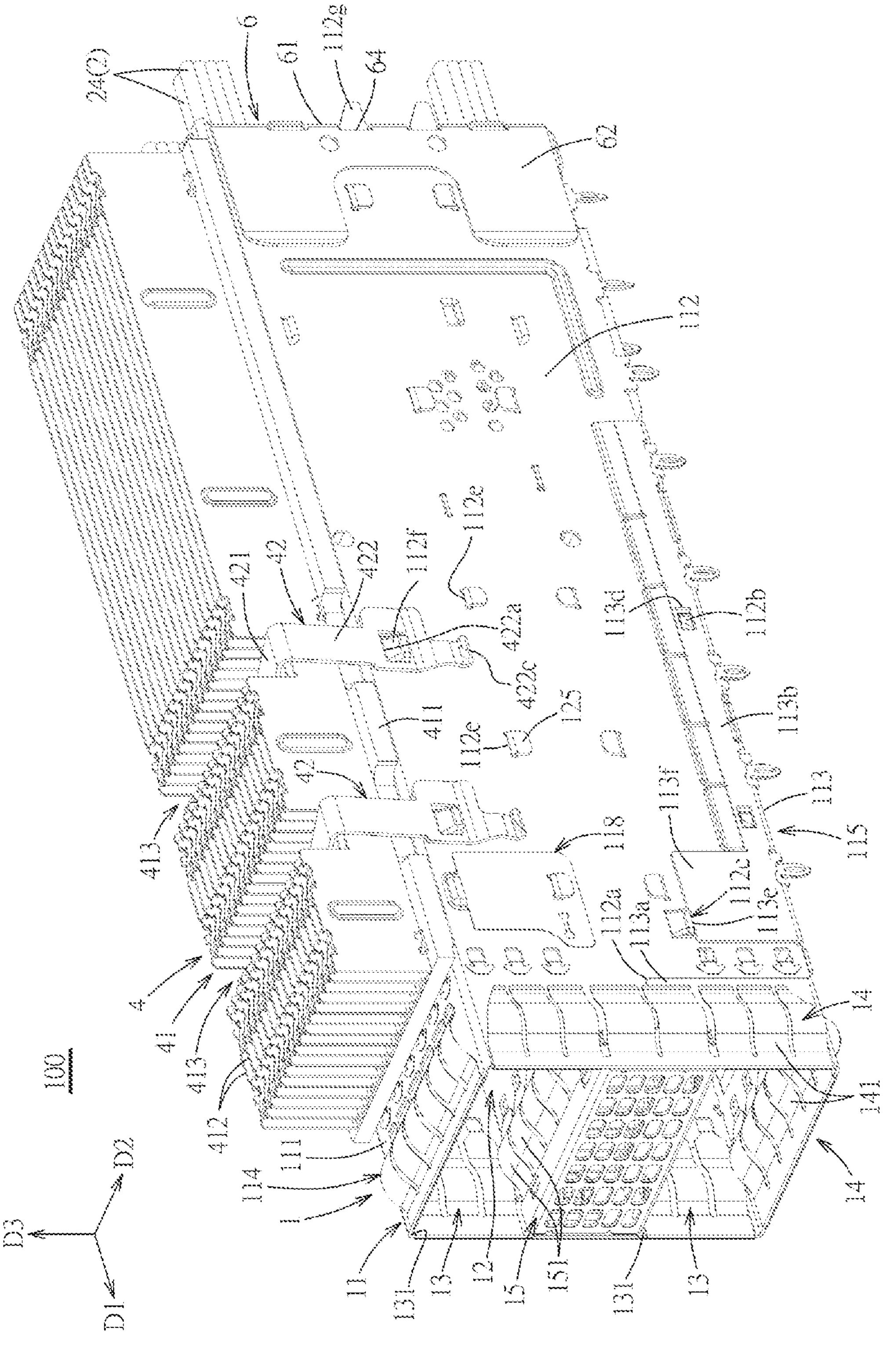
FIG. 1 is a three-dimensional view of a connector assembly in an example of the present invention.

Referring to FIG. 1 to FIG. 4, a connector assembly 100 in an example of the present invention is suitable for inserting a pluggable module 200 therein. The pluggable module 200 includes a housing 201, an insertion plate 202 and a cable 203. The housing 201 includes an insertion portion 201*a*. The insertion plate 202 is disposed at a distal end of the insertion portion 201*a*, and has a plurality of contact finger portions 202*a* thereon. The cable 203 is disposed at the housing 201 and is mechanically and electrically connected to the insertion plate 202. The connector assembly 100 includes a shielding cover 1, a socket connector 2, two bolts 3, an upper heat dissipation module 4, a lower heat dissipation module 5, a rear cover 6 and two wire organizers 7.

The shielding cover 1 is constructed, for example, by performing stamping, bending, and other machining processes on a conductive metal plate, and is used to guide the pluggable module 200 and achieves electromagnetic interference shielding. The shielding cover 1 includes a cover body 11, a compartment frame 12 disposed at the cover body 11, and two insertion channels 13 jointly defined by the cover body 11 and the compartment frame 12 and vertically separated by the compartment frame 12. The cover body 11 extends in a front-rear direction D1 (the direction indicated by the arrow is front, and the reverse direction is rear), and includes a top wall 111, two side walls 112 spaced apart and opposite to each other in a left-right direction D2 (the direction indicated by the arrow is right, and the reverse direction is left) and connected to two sides of the top wall 111, and a bottom wall 113 spaced apart from and opposite to the top wall 111 in an up-down direction D3 (the direction indicated by the arrow is up, and the reverse direction is down) and connected to bottom edges of the two side walls 112.

In the present example, the cover body 11 includes an upper housing 114 and a lower housing 115 assembled with each other and defining the insertion channels 13. The upper housing 114 has the top wall 111 and the two side walls 112 that are integrally connected to each other. The lower housing 115 has the bottom wall 113, and the lower housing 115 is disposed at the two side walls 112 of the upper housing 114 by assembling therewith. A recessed portion 112*a* is formed at a bottom edge near a front end of each of the side walls 112 of the upper housing 114, and each side wall 112 is outwardly provided with a plurality of engagement blocks 112*b* and an insertion hole 112*c* having a downward-facing opening. The bottom wall 113 of the lower housing 115 is integrally formed with two protruding portions 113*a* disposed upward and correspondingly matching the recessed portions 112*a* of the two side walls 112, and two side plates 113*b* correspondingly installed at outer sides of the two side walls 112. The recessed portion 112*a* is provided with a front insertion portion 112*d*. The protruding portion 113*a* is provided with a front insertion hole 112*c* correspondingly matching the front insertion portion 112*d*, and the front insertion portion 112*d* is inserted in the front insertion hole 112*c*. Each of the side plates 113*b* is provided with a plurality of engagement holes 113*d* matching the engagement blocks 112*b* of the corresponding side wall 112, and an insertion portion 113*e* inserted upward into the insertion hole 112*c* of the corresponding side wall 112, thereby enabling the bottom wall 113 of the lower housing 115 to be installed at and combined with the two side walls 112 of the upper housing 114.

Referring to FIG. 1 to FIG. 5, the compartment frame 12 has an upper wall 121 and a lower wall 122 spaced apart and opposite to each other in the up-down direction, two side connecting walls 123 connected between the upper wall 121 and the lower wall 122 and spaced apart and opposite to each other in the left-right direction, a front connecting wall 124 connected between the upper wall 121 and the lower wall 122 and located at the front end, and a plurality of fixing fold members 125 disposed at side edges of the upper wall 121 and the lower wall 122. Each of the side walls 112 of the cover body 11 of the shielding cover 1 further has a plurality of fixing through-holes 112*e* that correspondingly match the plurality of fixing fold members 125. The plurality of fixing fold members 125 are bent after passing through the plurality of fixing through-holes 112*e*, thereby enabling the compartment frame 12 to be installed on the two side walls 112 of the cover body 11 of the shielding cover 1. The insertion channel 13 located above is jointly defined by the top wall 111, the two side walls 112, and the upper wall 121 of the compartment frame 12, and the insertion channel 13 located below is jointly defined by the two side walls 112, the bottom wall 113, and the lower wall 122 of the compartment frame 12. Each of the insertion channels 13 has a front insertion port 131 located at a front end and used for the pluggable module 200 to be inserted therein, and a rear opening 132 located at a rear end.

Referring to FIG. 2 to FIG. 6, the socket connector 2 is disposed at a rear segment of the shielding cover 1, and includes two socket housings 21 arranged in the up-down direction and respectively disposed at the two insertion channels 13 via the two rear openings 132, an intermediate housing 22 disposed between the two socket housings 21, a plurality of socket terminals 23, and a plurality of cables 24. Each of the socket housings 21 has an insertion slot 211 facing forwards, and the plurality of socket terminals 23 are disposed at the socket housing 21 and extend into the insertion slot 211. In the present example, the socket connector 2 further includes a plurality of terminal fixing blocks 25 and 26 partially covering the plurality of socket terminals 23. The terminal fixing blocks 25 located in the middle and having a vertical configuration constitute the intermediate housing 22, and tail portions 32 of the plurality of socket terminals 23 disposed at the vertically configured terminal fixing blocks 25 extend out of the bottom of the intermediate housing 22. The terminal fixing blocks 26 located on left and right sides and having a horizontal configuration are disposed at the two socket housings 21, and terminal tail portions 231 of the plurality of socket terminals 23 disposed at the horizontally configured terminal fixing blocks 26 are respectively connected to the plurality of cables 24, and the plurality of cables 24 extend out of rear ends of the two socket housings 21.

Referring to FIG. 5 to FIG. 8, the compartment frame 12 further has an intermediate recess 126 located at a rear segment and extending in the front-rear direction, and two support structures 127 located at the rear segment and providing support between the two socket housings 21. The two support structures 127 are separated by the intermediate recess 126 in the left-right direction. It should be noted that the compartment frame 12 may also not have the intermediate recess 126 in other embodiments, and the number of the support structures 127 may be only one or three or more, which is not limited by the present example. Each of the support structures 127 includes an upper support plate 127*a* integrally formed at a rear segment of the upper wall 121, a lower support plate 127*b* integrally formed at a rear segment of the lower wall 122, and a support block 127*c* disposed between the upper support plate 127*a* and the lower support plate 127*b*. The upper support plate 127*a* and the lower support plate 127*b* respectively have a plurality of positioning protrusions 127*d* and 127*e* located around the support block 127*c* and used to position the support block 127*c*. In detail, the intermediate recess 126 partially accommodates the intermediate housing 22. The two socket housings 21 and the intermediate housing 22 jointly define two channels 27 located on left and right sides of the intermediate housing 22, and the two support structures 127 of the compartment frame 12 are located at the two channels 27 respectively to provide support between the two socket housings 21.

Referring to FIG. 3 to FIG. 4 and FIG. 7 to FIG. 9, the two bolts 3 pass through the two socket housings 21 of the socket connector 2, and respectively and correspondingly pass through the two support structures 127. Each of the socket housings 21 is provided with a first through-hole 212 for the bolt 3 to pass through, each of the upper support plates 127*a* is provided with a second through-hole 127*f* for the bolt 3 to pass through, each of the lower support plates 127*b* is provided with a third through-hole 127*g* for the bolt 3 to pass through, and each support block 127*c* is provided with a fourth through-hole 127*h* for the bolt 3 to pass through. In the present example, the bolt 3 has an interference bump 31 that interferes with the inner wall surface of the first through-hole 212 to strengthen a fixing force, and a tail portion 32 located at a lower end and having a needle hole-shaped pressure fit structure. The bottom of the connector assembly 100 is disposed at a circuit substrate 300, the tail portion 32 of each of the bolts 3 is fixedly inserted downward into a conductive through-hole 301 in the circuit substrate 300, and the bolt 3 is connected to a ground component 213 (referring to FIG. 9, the ground component, for example, may be a ground terminal or a ground member) in the socket housing 21 of the socket connector 2 and a ground line of the circuit substrate 300. Additionally, in the present example, the cover body 11 of the shielding cover 1 further has a bottom opening 116 located behind the bottom wall 113. The bottom opening 116 allows the tail portion 32 of the bolt 3 and the terminal tail portion 231 of the socket terminal 23 disposed at the intermediate housing 22 in the socket connector 2 to pass through so as to be disposed at the circuit substrate 300.

The support structure 127 of the compartment frame 12 provides support between the two socket housings 21, and includes the support block 127*c* disposed between the upper support plate 127*a* and the lower support plate 127*b*, thereby providing solid and strong support between the two socket housings 21. Secondly, the bolt 3 passing through the two socket housings 21 and the support structure 127 can further maintain the relative position between the two socket housings 21 and the support structure 127, so as to increase the support strength of the support structure 127. In addition, the bolt 3 can be further connected to the ground component 213 in the socket housing 21 of the socket connector 2 and the ground line of the circuit substrate 300 so as to serve as a component for grounding.

After the pluggable module 200 enters, from any one of the front insertion ports 131, the corresponding insertion channel 13 of the shielding cover 1, the insertion plate 202 at the distal end of the insertion portion 201*a* of the pluggable module 200 can be inserted into the insertion slot 211 of the corresponding socket housing 21 in the socket connector 2, such that the contact finger portions 202*a* of the insertion plate 202 are in contact with the socket terminals 23 within the insertion slot 211 of the socket housing 21, thereby enabling the pluggable module 200 and the socket connector 2 of the connector assembly 100 to be connected to each other. In addition, an installation hole of an enclosure (not shown in the figures) may be arranged at a front segment of the shielding cover 1 adjacent to the front insertion ports 131, and the shielding cover 1 further includes a plurality of first ground elements 14 disposed adjacent to the two front insertion ports 131 at the cover body 11, and a second ground element 15 disposed at the front connecting wall 124 of the compartment frame 12. The first ground elements 14 have a plurality of first elastic finger portions 141 extending backward from the front insertion ports 131 and arranged on the outer side and the inner side. The plurality of first elastic finger portions 141 located on the outer side are used to contact a portion of the enclosure located at the periphery of the installation hole, and the plurality of first elastic finger portions 141 located on the inner side are used to contact the housing 201 of the pluggable module 200. The second ground element 15 has a plurality of second elastic finger portions 151 extending backward from the front connecting wall 124 and arranged on the upper side and the lower side of the compartment frame 12. The plurality of second elastic finger portions 151 are used to contact the housing 201 of the pluggable module 200.

Figure 2:
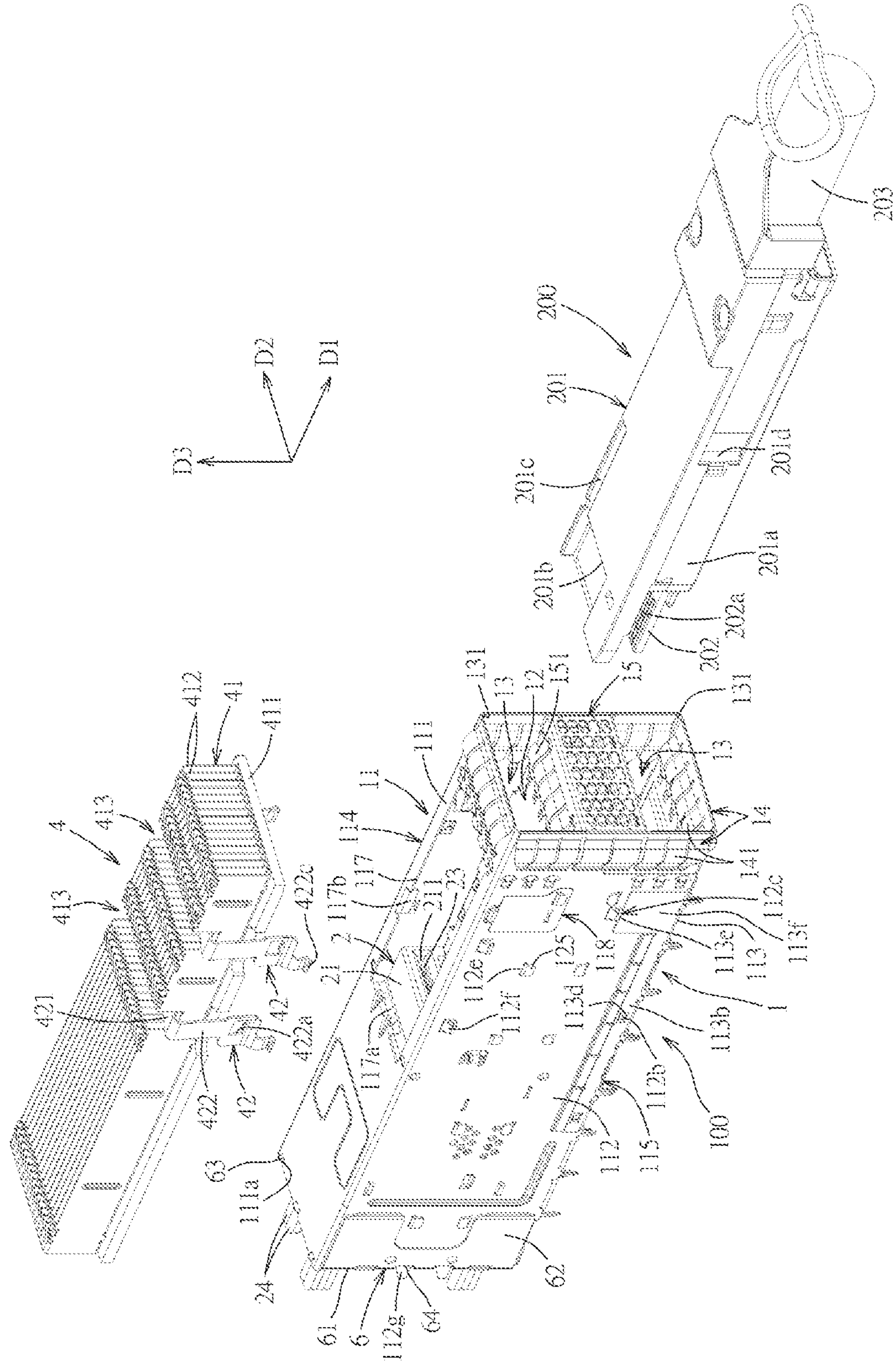
FIG. 2 is a three-dimensional exploded view of the example with a pluggable module.
Figure 3:
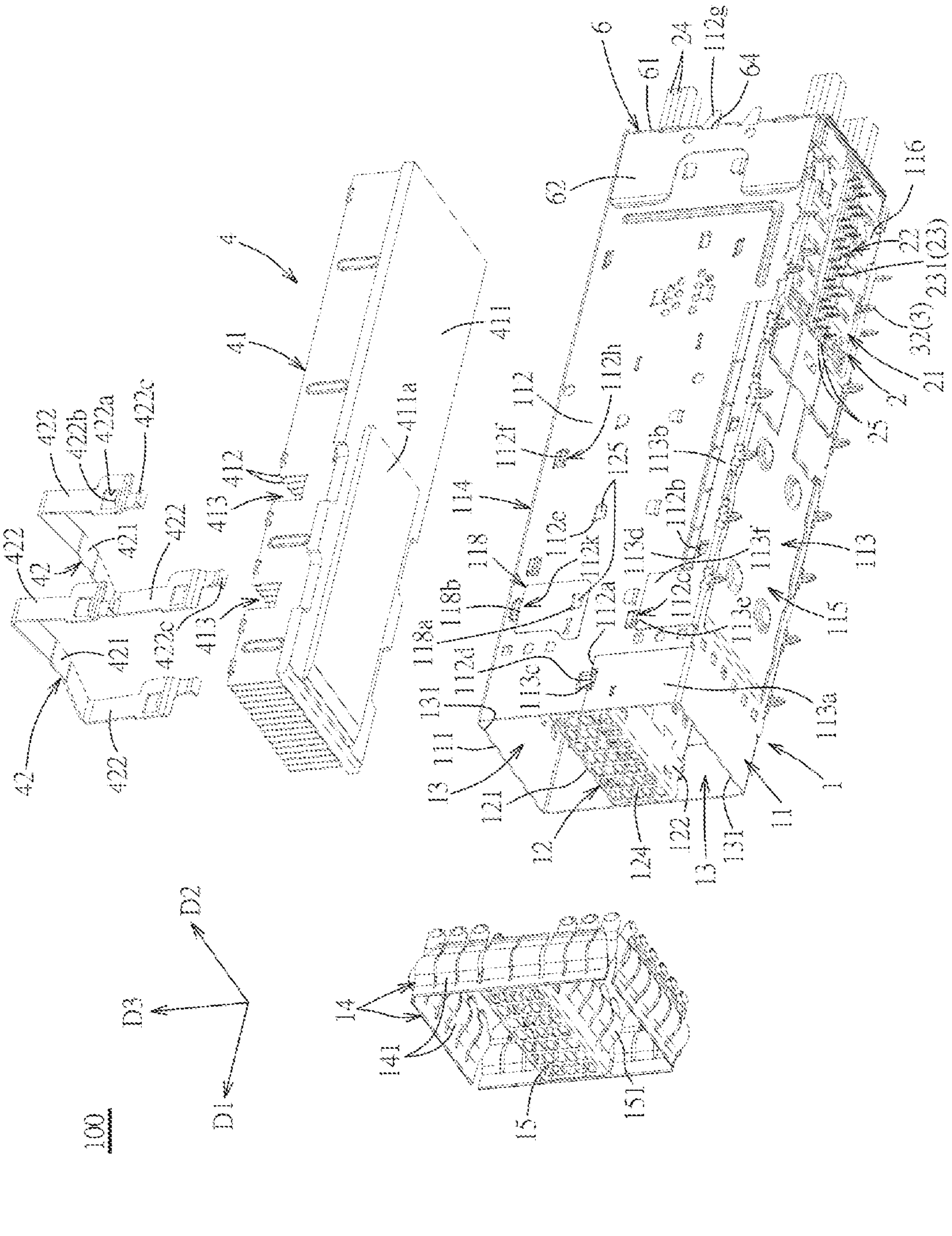
FIG. 3 is a three-dimensional exploded view of the example.
Figure 4:
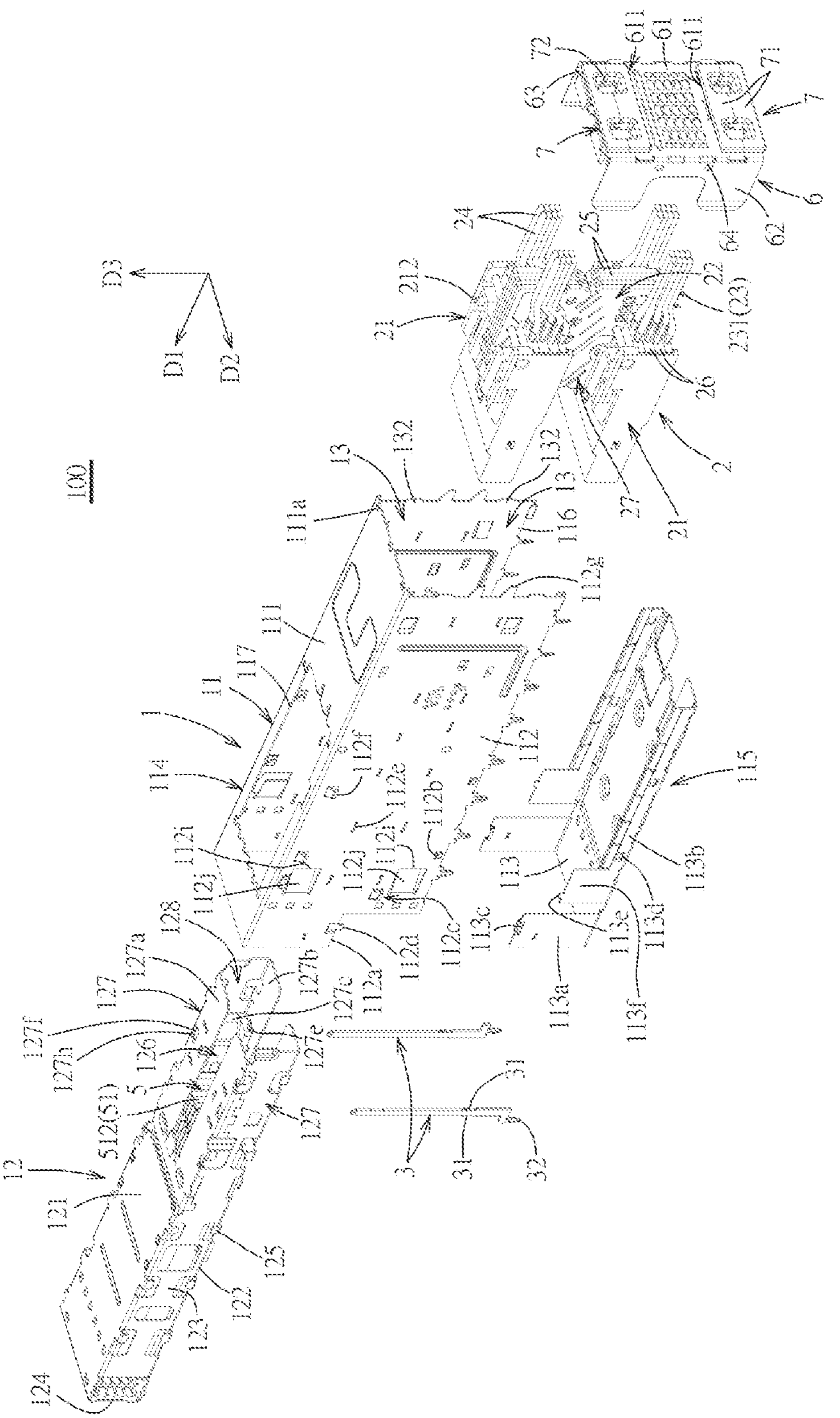
FIG. 4 is a further three-dimensional exploded view of the example.
Figure 5:
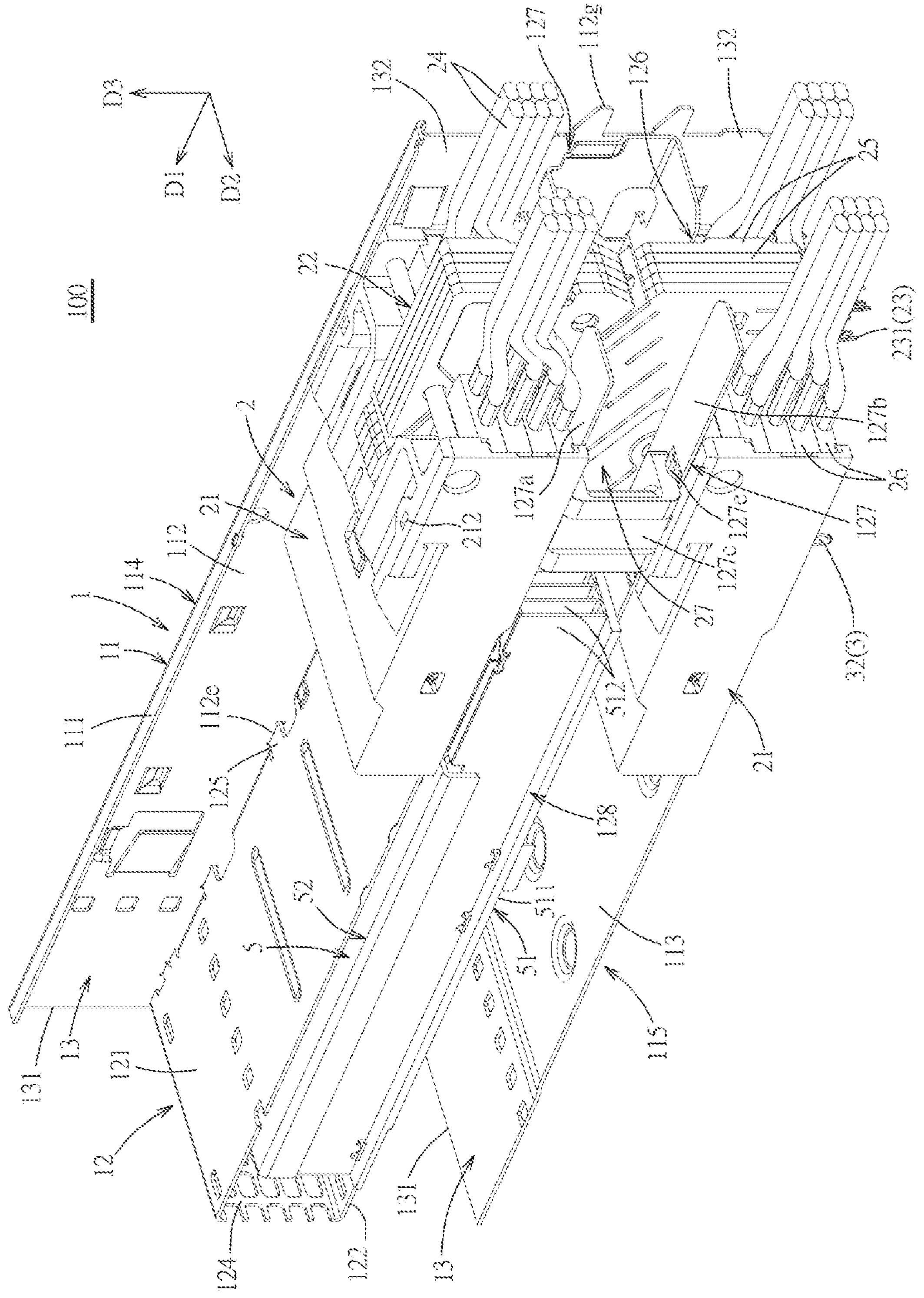
FIG. 5 is a partial three-dimensional view of the example.
Figure 6:
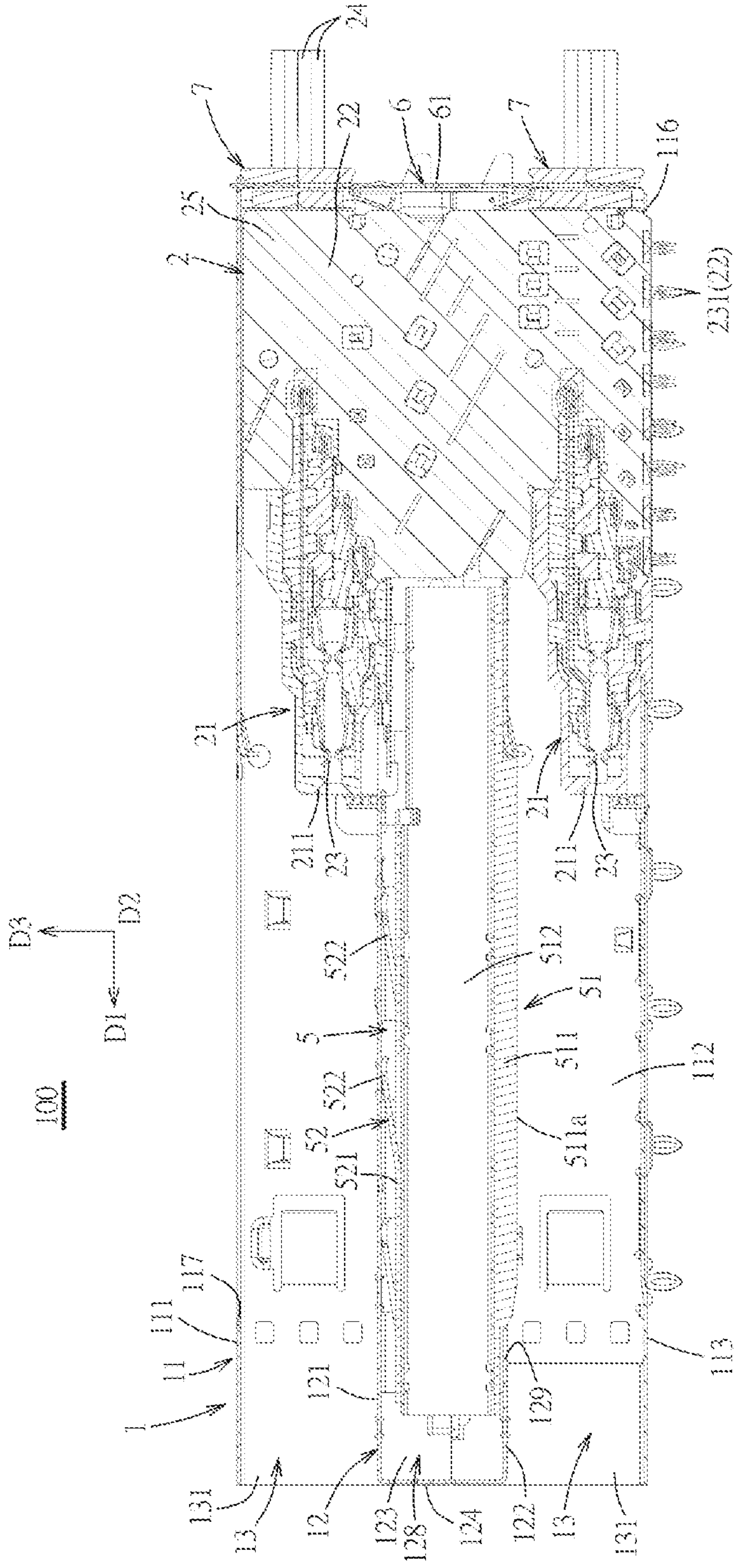
FIG. 6 is a partial cross-sectional view of the example.
Figure 7:
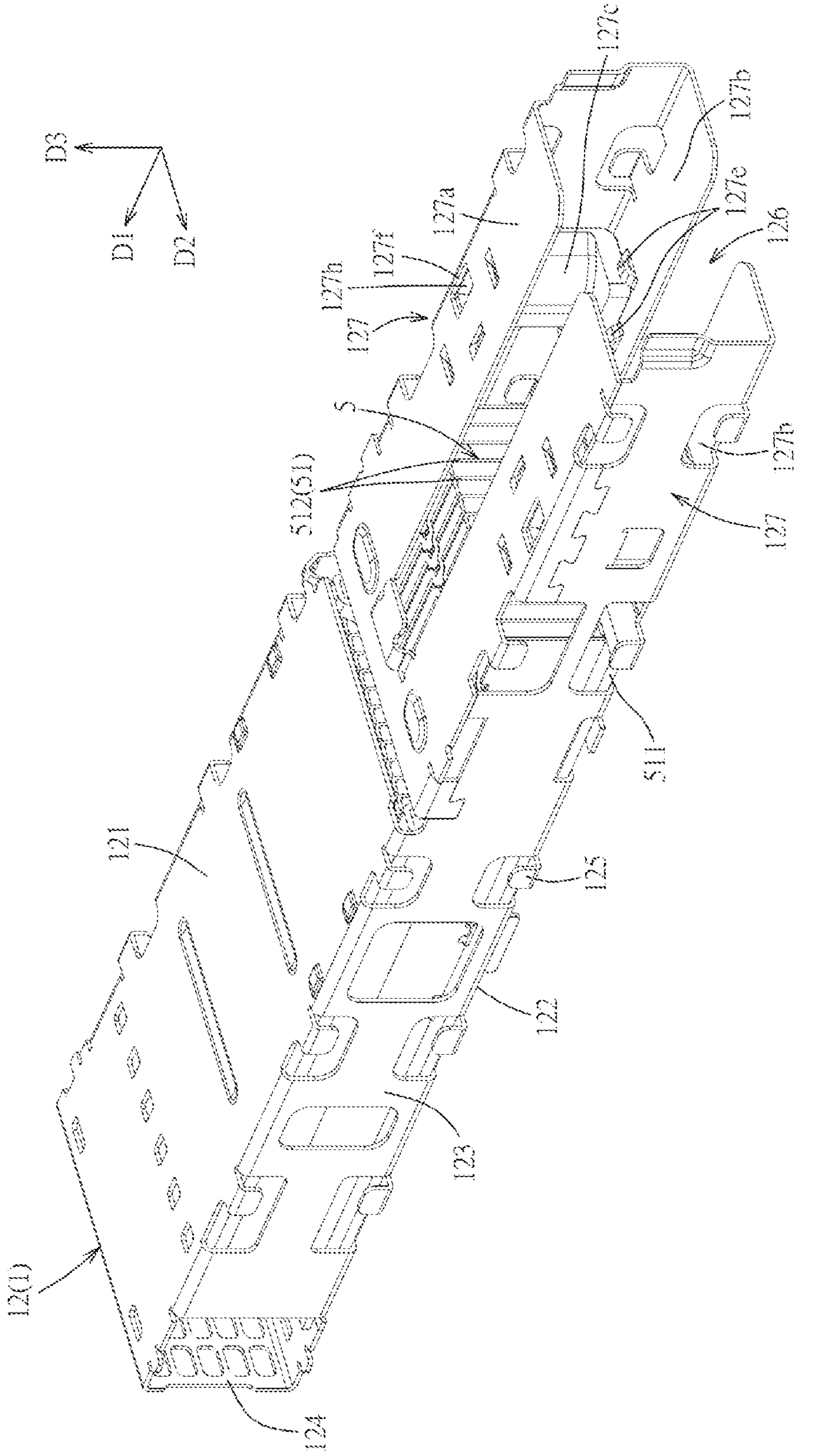
FIG. 7 is a three-dimensional view of a compartment frame of a shielding cover and a lower heat dissipation module in the example.
Figure 8:
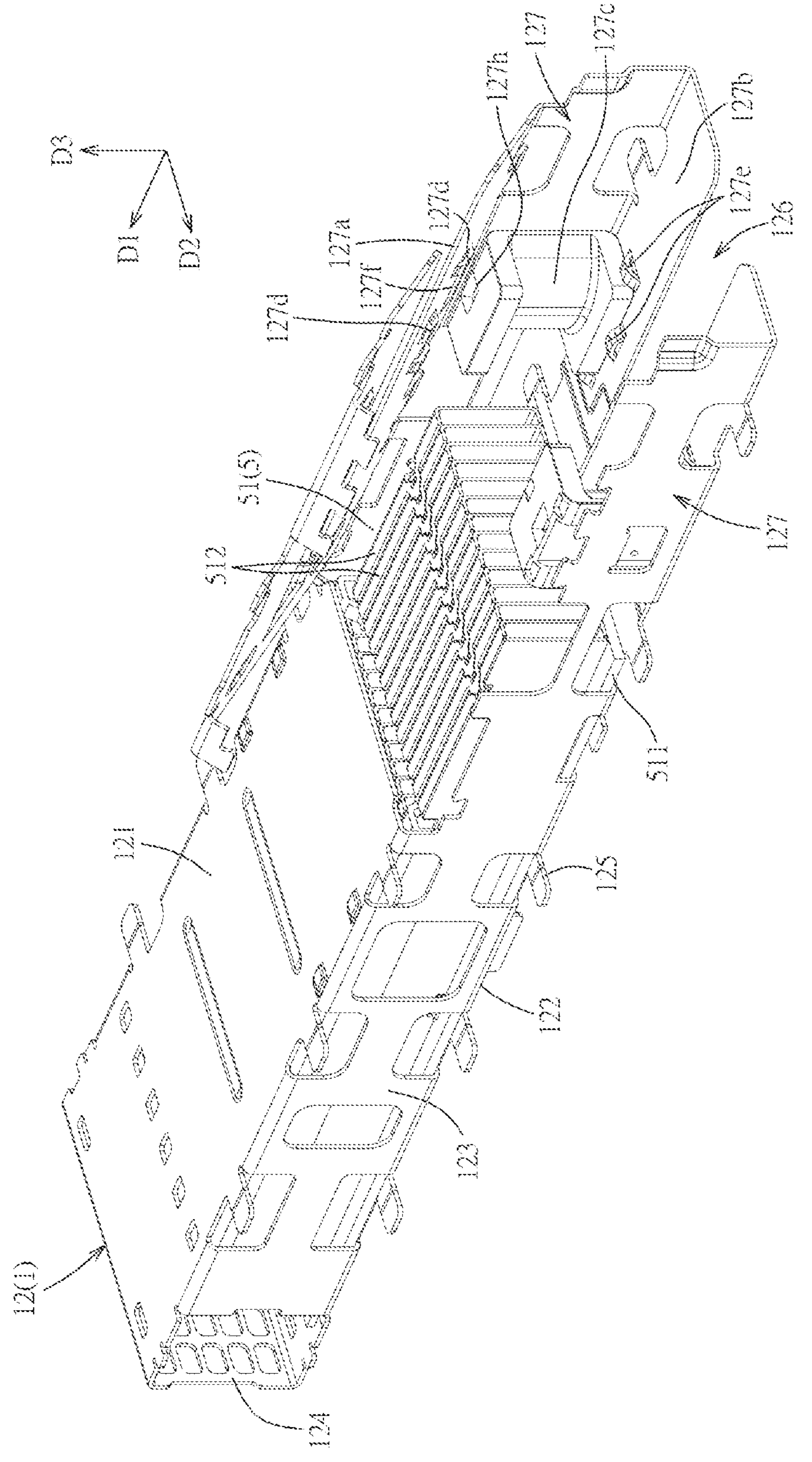
FIG. 8 is a three-dimensional view similar to FIG. 7, in which part of the compartment frame is opened upward.
Figure 9:
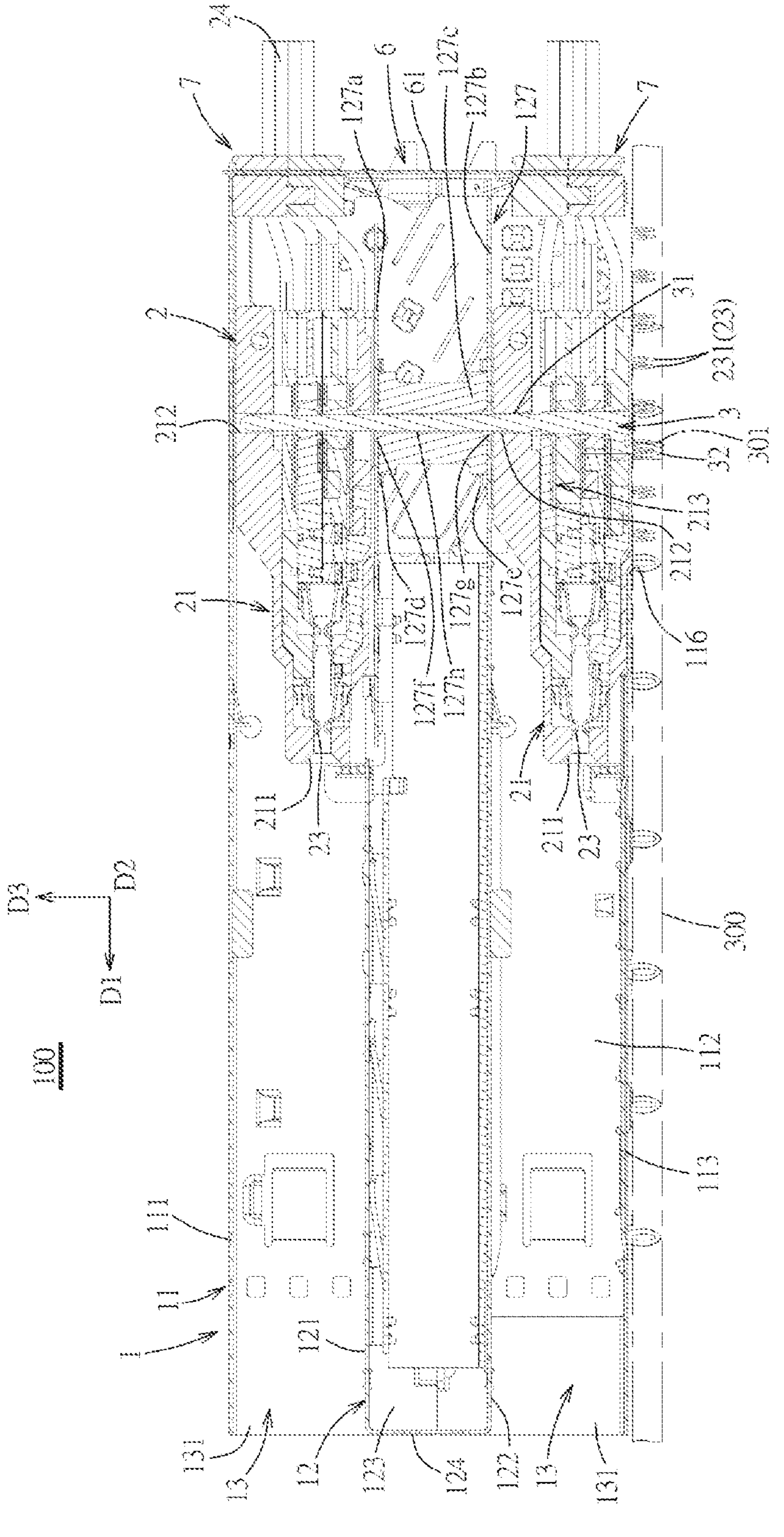
FIG. 9 is another partial cross-sectional view of the example.

Referring to FIG. 2, FIG. 3, and FIG. 6, the cover body 11 of the shielding cover 1 further has a top opening 117 formed in the top wall 111 and communicating with the insertion channel 13 located above. The upper heat dissipation module 4 includes an upper heat sink 41, and two elastic fasteners 42 disposed on the two side walls 112 of the shielding cover 1 and connecting the upper heat sink 41 to the top wall 111 of the shielding cover 1. The upper heat sink 41 has an upper heat dissipation substrate 411 disposed on the top wall 111 from above, a plurality of upper heat dissipation fins 412 fastened to each other side by side in the left-right direction and disposed on the top surface of the upper heat dissipation substrate 411 by means of, for example, welding, and two accommodating recesses 413 formed on the plurality of upper heat dissipation fins 412, arranged side by side in the front-rear direction D1, and corresponding to the two elastic fasteners 42. The upper heat dissipation substrate 411 has an upper heat dissipation coupling portion 411*a* formed at the bottom. The upper heat dissipation coupling portion 411*a* extends downward, through the top opening 117, into the insertion channel 13 located above. Each of the elastic fasteners 42 has a pressing and abutting portion 421 disposed at the corresponding accommodating recess 413 and configured to press and abut the upper heat sink 41 downward in an elastic manner, and two fastening portions 422 extending downward from the left and right ends of the pressing and abutting portion 421 and fastened to the two side walls 112 of the shielding cover 1. Each of the side walls 112 is provided with a fastening protruding portion 112*f*, each of the fastening portions 422 is provided with a fastening hole 422*a* fitting with the fastening protruding portion 112E In addition, the fastening protruding portion 112*f* has a downward-facing hole 112*h*, and the fastening hole 422*a* has an insertion member 422*b* inserted upward into the hole 112*h*, thereby further increasing the holding force between the fastening portion 422 and the fastening protruding portion 112E The downward pressing and abutting acting force provided by the two elastic fasteners 42 can ensure that when the pluggable module 200 is inserted into the insertion channel 13 located above, the upper heat dissipation coupling portion 411*a* of the upper heat sink 41 may remain in contact with the top surface of the housing 201 of the pluggable module 200 as completely as possible. In addition, the bottom of each of the fastening portions 422 is further provided with a hook portion for unlocking 422*c* reversely folded outward and protruding out. The hook portions for unlocking 422*c* of the two fastening portions 422 of the same elastic fastener 42 are offset from each other in the front-rear direction D1, so that when two connector assemblies 100 are arranged side by side in the left-right direction, the adjacent hook portions for unlocking 422*c* on the two connector assemblies 100 can be disposed offset from each other, thereby facilitating operations during unlocking of the elastic fastener 42.

In addition, it should be noted that in the present example, the cover body 11 is further provided with a blocking member 117*a* extending downward from the rear edge of the top opening 117, and a guiding member 117*b* extending downward from the side edge of the top opening 117. The top surface of the insertion portion 201*a* of the pluggable module 200 is provided with a block portion 201*b* that can be stopped by the blocking member 117*a*, and a guiding slot 201*c* used to accommodate the guiding member 117*b* to provide a guiding function.

Figure 10:
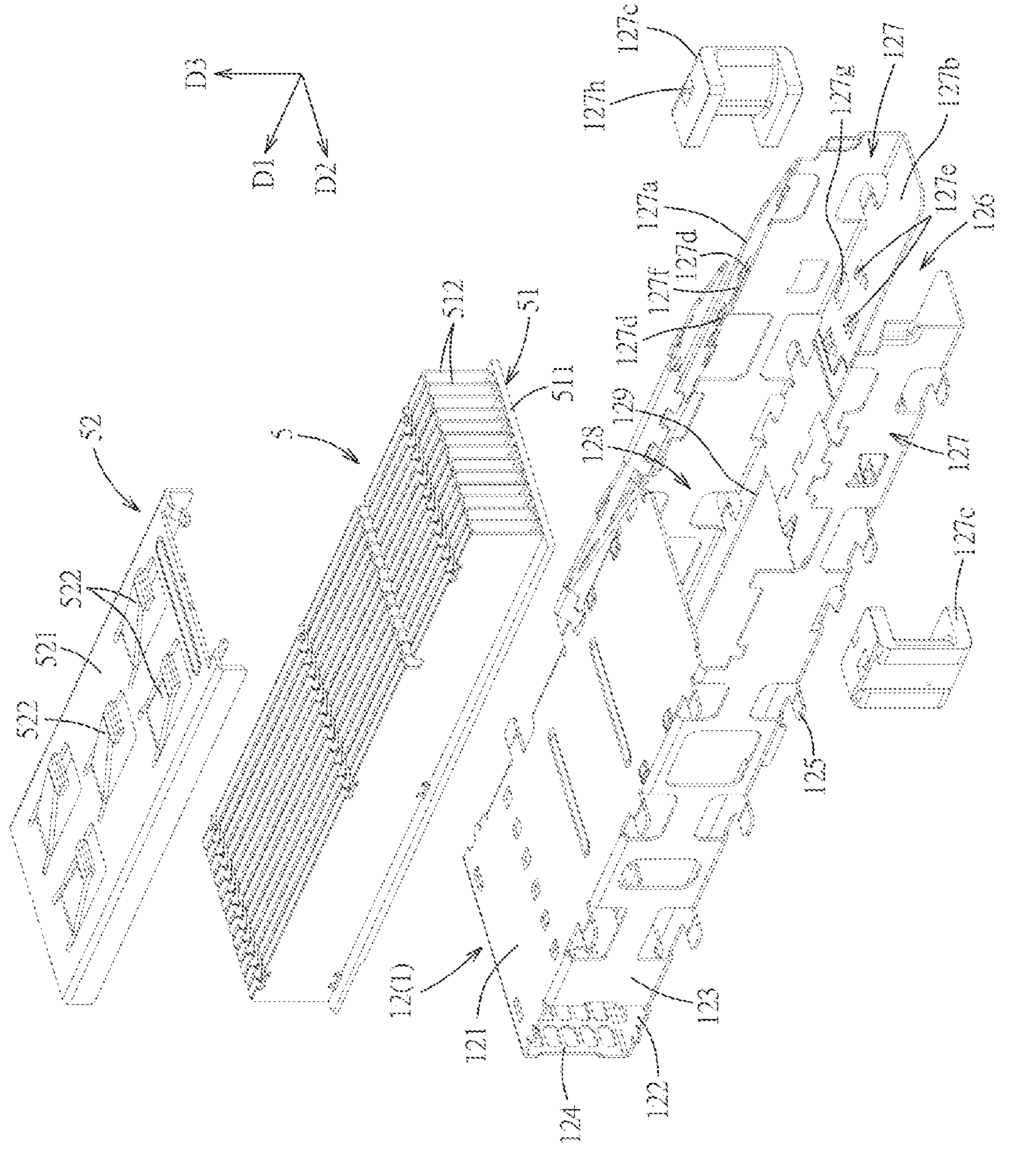
FIG. 10 is a three-dimensional exploded view of FIG. 8.
Figure 11:
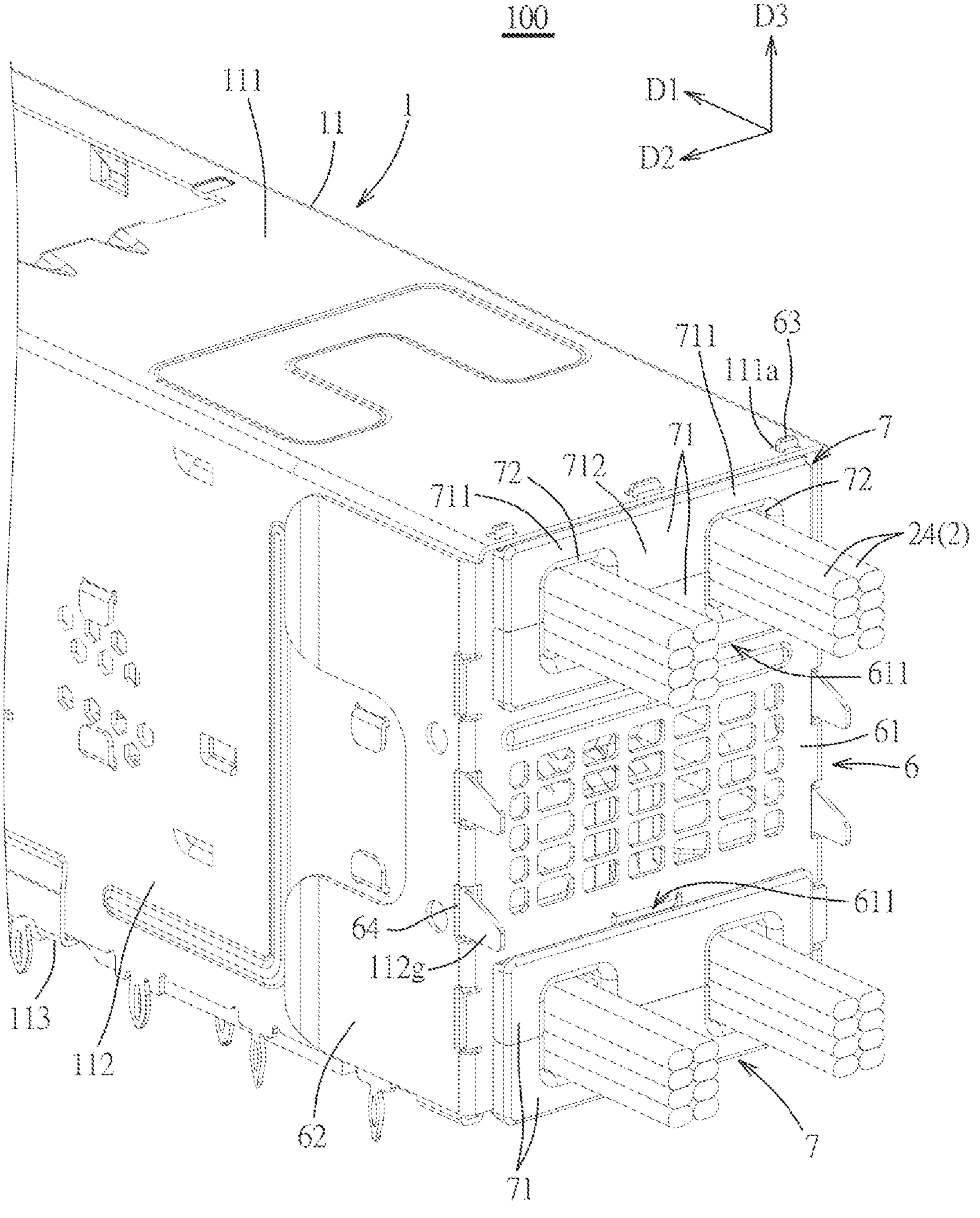
FIG. 11 is a partial three-dimensional view of the example.

Referring to FIG. 6 and FIG. 10, the compartment frame 12 of the shielding cover 1 further has an interior space 128 that is jointly defined by the upper wall 121, the lower wall 122, the two side connecting walls 123 and the front connecting wall 124, and a lower opening 129 formed at the lower wall 122 and communicating the interior space 128 with the insertion channel 13 located below. The lower heat dissipation module 5 is disposed in the interior space 128, and has a lower heat sink 51 and an elastic biasing member 52. The lower heat sink 51 has a lower heat dissipation substrate 511 disposed at the lower wall 122, and a plurality of lower heat dissipation fins 512 fastened to each other side by side in the left-right direction and disposed on the top surface of the lower heat dissipation substrate 511 by means of, for example, welding. The lower heat dissipation substrate 511 has a lower heat dissipation coupling portion 511*a* formed at the bottom, and the lower heat dissipation coupling portion 511*a* extends downward, through the lower opening 129, into the insertion channel 13 located below. The elastic biasing member 52 is disposed between the lower heat sink 51 and the upper wall 121 of the compartment frame 12, and has a body 521 disposed at the lower heat sink 51, and a plurality of elastic members 522 integrally formed from the body 521 upward and backward and abutting the upper wall 121. An elastic acting force provided by the plurality of elastic members 522 can ensure that when the pluggable module 200 is inserted into the insertion channel 13 located below, the lower heat dissipation coupling portion 511*a* of the lower heat sink 51 may remain in contact with the top surface of the housing 201 of the pluggable module 200 as completely as possible.

Further, it should be noted that in the present example, each side wall 112 of the cover body 11 is further provided with two side edge openings 112*i* respectively corresponding to the two insertion channels 13, and two lock members 112*j* obliquely extending inward and backward from front side edges of the side edge openings 112*i*. The lock member 112*j* is configured to engage with a lock recessed portion 201*d* at the side edge of the insertion portion 201*a* of the pluggable module 200, thereby providing a locking function for the pluggable module 200 inserted into the insertion channel 13. In addition, the side edge opening 112*i* located below is blocked by a front block portion 113*f* at the front segment of the side plate 113*b* of the bottom wall 113, and the side edge opening 112*i* located above is blocked by a block member 118 disposed at the side wall 112, thereby reducing the impact of the side edge openings 112*i* on electromagnetic masking performance. The block member 118 has a fixing through-hole 118*a* for one of the fixing fold members 125 of the compartment frame 12 to pass through and to be bent and fixed, and a fixing insertion member 118*b* extending upward and inserted into a fixing insertion hole 112*k* of the side wall 112.

Referring to FIG. 11 to FIG. 15, the plurality of cables 24 connected to the plurality of socket terminals 23 in the socket connector 2 extend backward out of the rear openings 132 of the two insertion channels 13. The rear cover 6 is, for example, made of a metal material. The rear cover 6 is installed at the rear openings 132 of the two insertion channels 13 of the shielding cover 1. The rear cover 6 includes a rear wall 61, two side engagement members 62 extending forward from left and right sides of the rear wall 61 to overlap with the two side walls 112 of the shielding cover 1, a plurality of upper engagement members 63 extending upward from the upper edge of the rear wall 61 and inserted into a plurality of through-holes 111*a* at the rear end of the top wall 111 of the shielding cover 1, and a plurality of fastening holes 64 formed at connection locations between the two side engagement members 62 and the rear wall 61. Each of the side walls 112 of the shielding cover 1 further has a plurality of fastening members 112*g* extending backward from a rear end edge, and the plurality of fastening members 112*g*, after passing through the plurality of fastening holes 64, are bent inward (not yet bent in the figures). In detail, in the present example, the two side engagement members 62 of the rear cover 6 obliquely extend forward and inward and distal ends thereof are folded outward. The two side engagement members 62 press and abut the two side walls 112 of the shielding cover 1 inward with a positive force.

The rear wall 61 has two wire organizer installation portions 611 respectively located above and below and respectively having one of the wire organizers 7 installed thereon. Each of the wire organizer installation portions 611 includes two recesses 611*a* integrally formed at the rear wall 61 and arranged side by side with each other in the left-right direction, and a spacer member 611*b* located between the two recesses 611*a*. Each recess 611*a* has a U-shaped recess structure, and each of the recesses 611*a* of the wire organizer installation portion 611 located above has an upward-facing opening, and each of the recesses 611*a* of the wire organizer installation portion 611 located below has a downward-facing opening.

Figure 12:
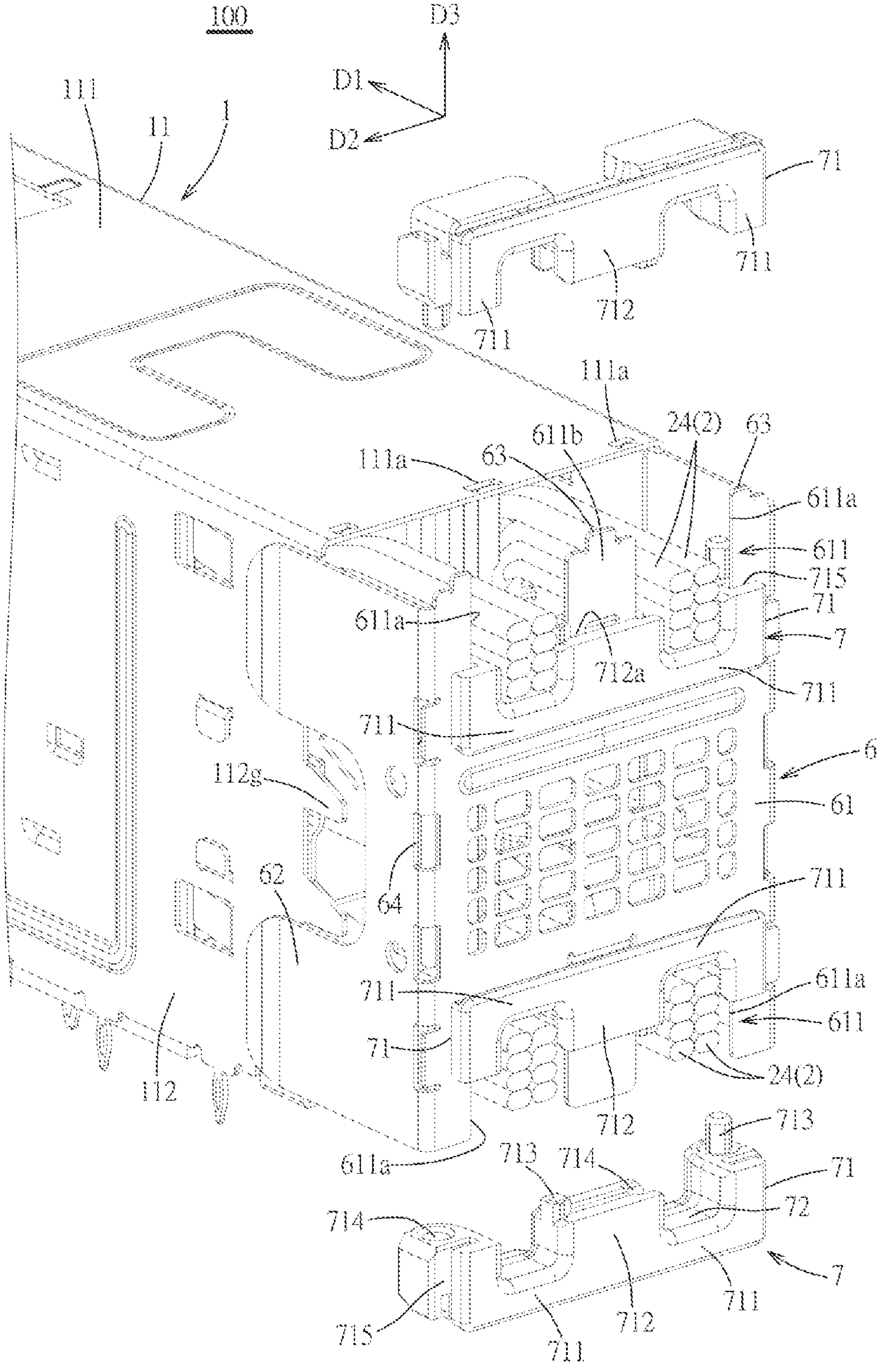
FIG. 12 is a three-dimensional exploded view of FIG. 11.
Figure 13:
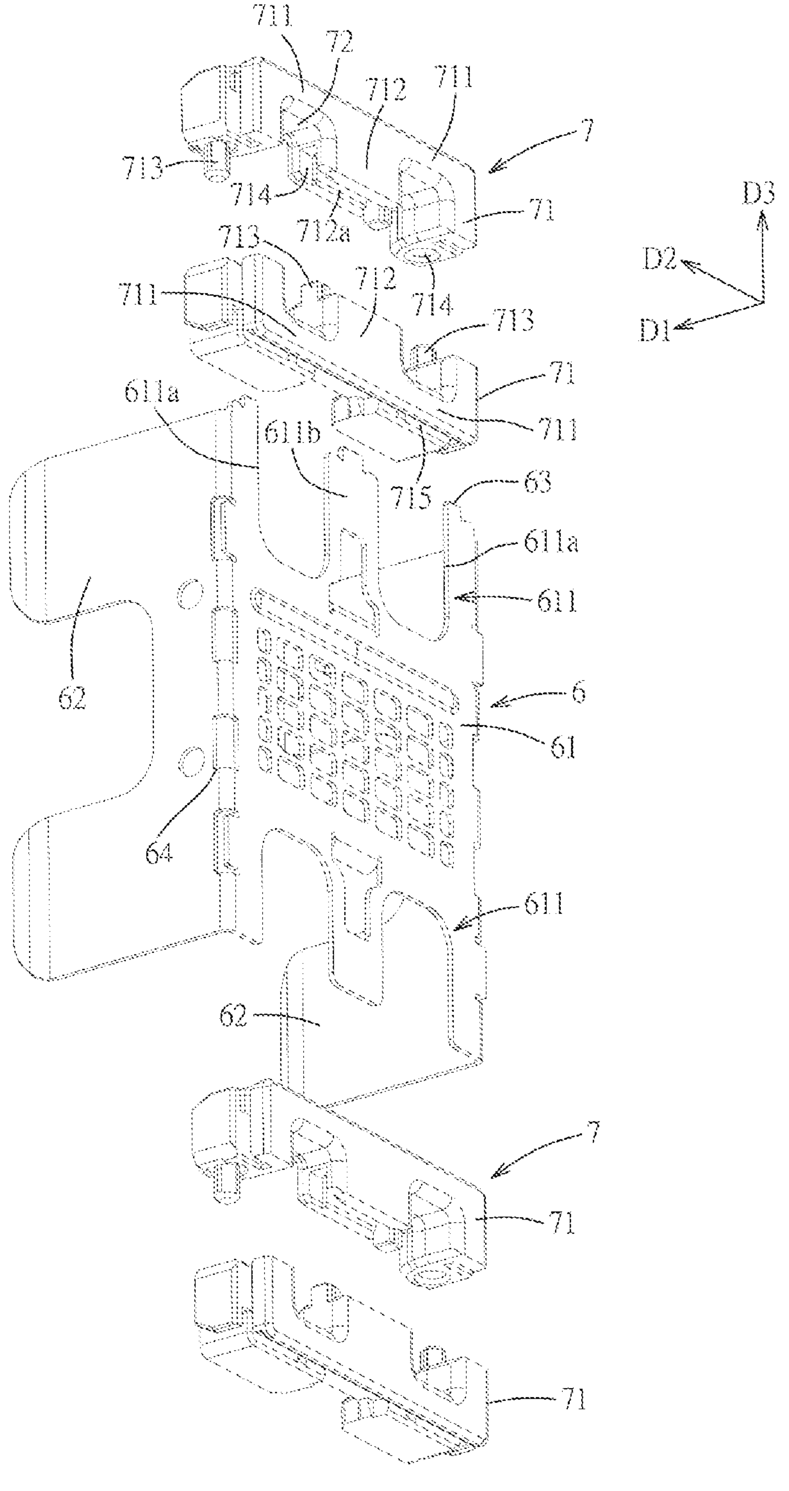
FIG. 13 and FIG. 14 are two three-dimensional exploded views of a rear cover and two wire organizers in the example.
Figure 14:
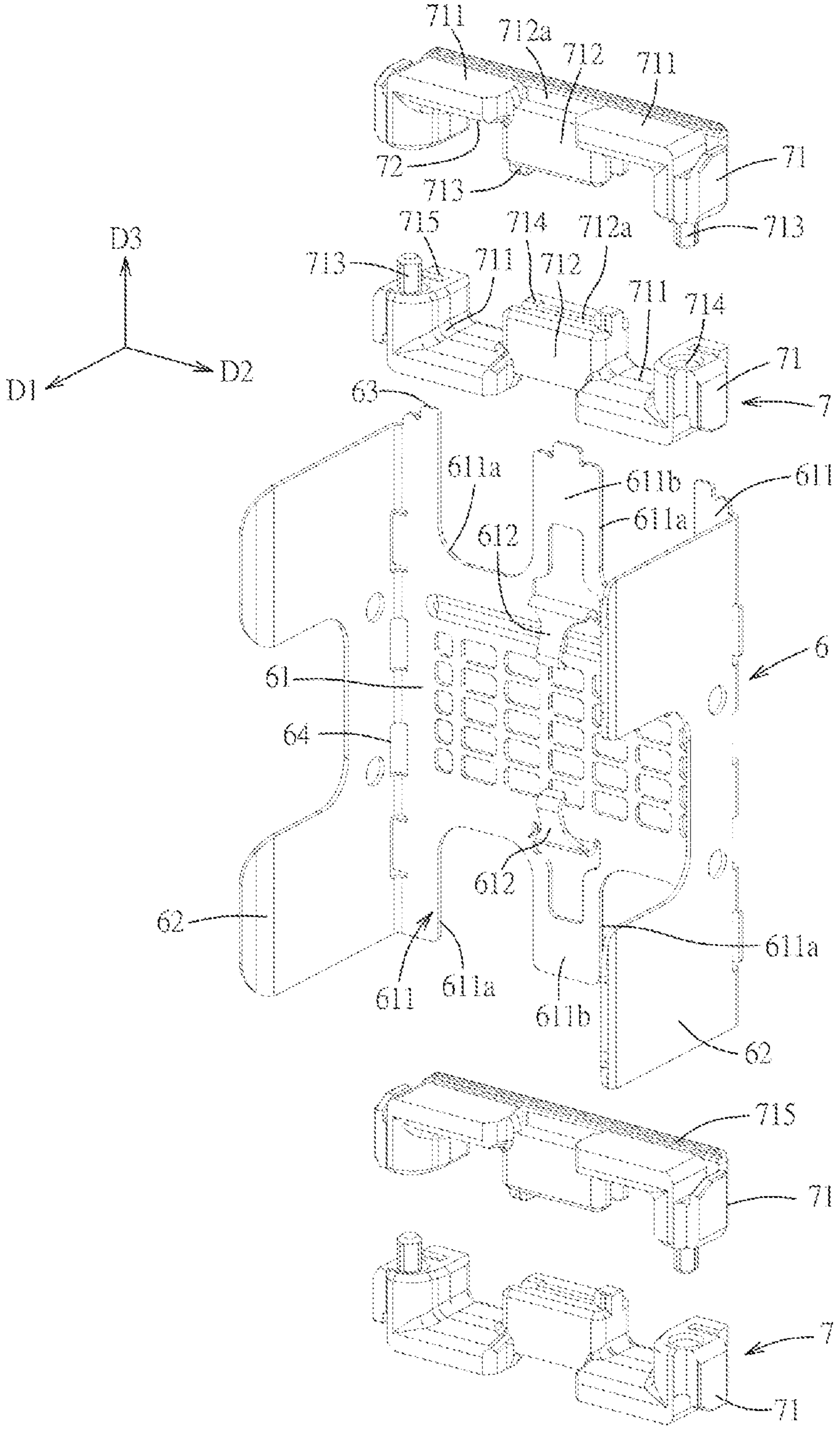

The two wire organizers 7 are, for example, made of an insulating material, and the two wire organizers 7 are installed at the two wire organizer installation portions 611 of the rear wall 61 respectively. Each of the wire organizers 7 has two half portions 71 combined with each other in the up-down direction, and two wire organizing holes 72 jointly defined by the two half portions 71 and arranged in the left-right direction. The plurality of cables 24 of the socket connector 2 are divided into four groups, and respectively extend through the four wire organizing holes 72 of the two wire organizers 7 backward. In detail, in the present example, the two half portions 71 of the wire organizer 7 have the same configuration and are combinable with each other. Each of the half portions 71 has two side portions 711 respectively installed within the two recesses 611*a*, a spacer portion 712 located between the two side portions 711 and having a through-slot 712*a*, and a plurality of combination protruding portions 713 and a plurality of combination recessed portions 714 formed on the side portions 711 and the spacer portion 712. The spacer member 611*b* is inserted in the through-slots 712*a* of the spacer portions 712 of the two half portions 71. Matching between the spacer member 611*b* and the through-slots 712*a* enables the wire organizer 7 to be securely installed at the wire organizer installation portion 611. The combination protruding portions 713 and the combination recessed portions 714 of the two half portions 71 are complementary to each other and are assembled with each other. Additionally, each of the half portions 71 further has slots 715 formed at the periphery thereof and correspondingly accommodating edges of the recesses 611*a*, thereby further enhancing the assembly strength between the wire organizer 7 and the rear wall 61 of the rear cover 6. As shown in FIG. 12, given that the wire organizer 7 is composed of the two half portions 71 combined with each other, one of the half portions 71 may be sleeved on the wire organizer installation portion 611 of the rear cover 6 first, so that when the cables 24 are in an assembled state, the rear cover 6 can be inserted between the cables 24 and the cables 24 can be placed inside the wire organizing holes 72 of the one half portion 71, and only then the other half portion 71 is installed. In this way, the cables 24, in the assembled state thereof, can be installed at the wire organizing holes 72 of the wire organizer 7 on the rear cover 6, and the rear cover 6 is then installed at the rear openings 132 of the two insertion channels 13 of the shielding cover 1.

The wire organizers 7 installed on the rear cover 6 allow the plurality of cables 24 to come out from behind, thereby realizing wire organizing and positioning functions. Also, the wire organizer 7 formed by combining the two half portions 71 can be separately and easily installed onto the rear cover 6 when the cables 24 are in an assembled state. In addition, the wire organizer 7 can be made of an insulating material, so that the edges of the wire organizing holes 72 of the wire organizer 7 are not as sharp as the rear cover 6, thereby protecting the cables 24 coming out of the rear cover 6 from being scratched.

It should be noted that the number of groups of the cables 24, the number of the wire organizers 7, and the number of the wire organizing holes 72 in the wire organizer 7 may all be adjusted as desired, and should not be limited by the numbers in the present example.

Figure 15:
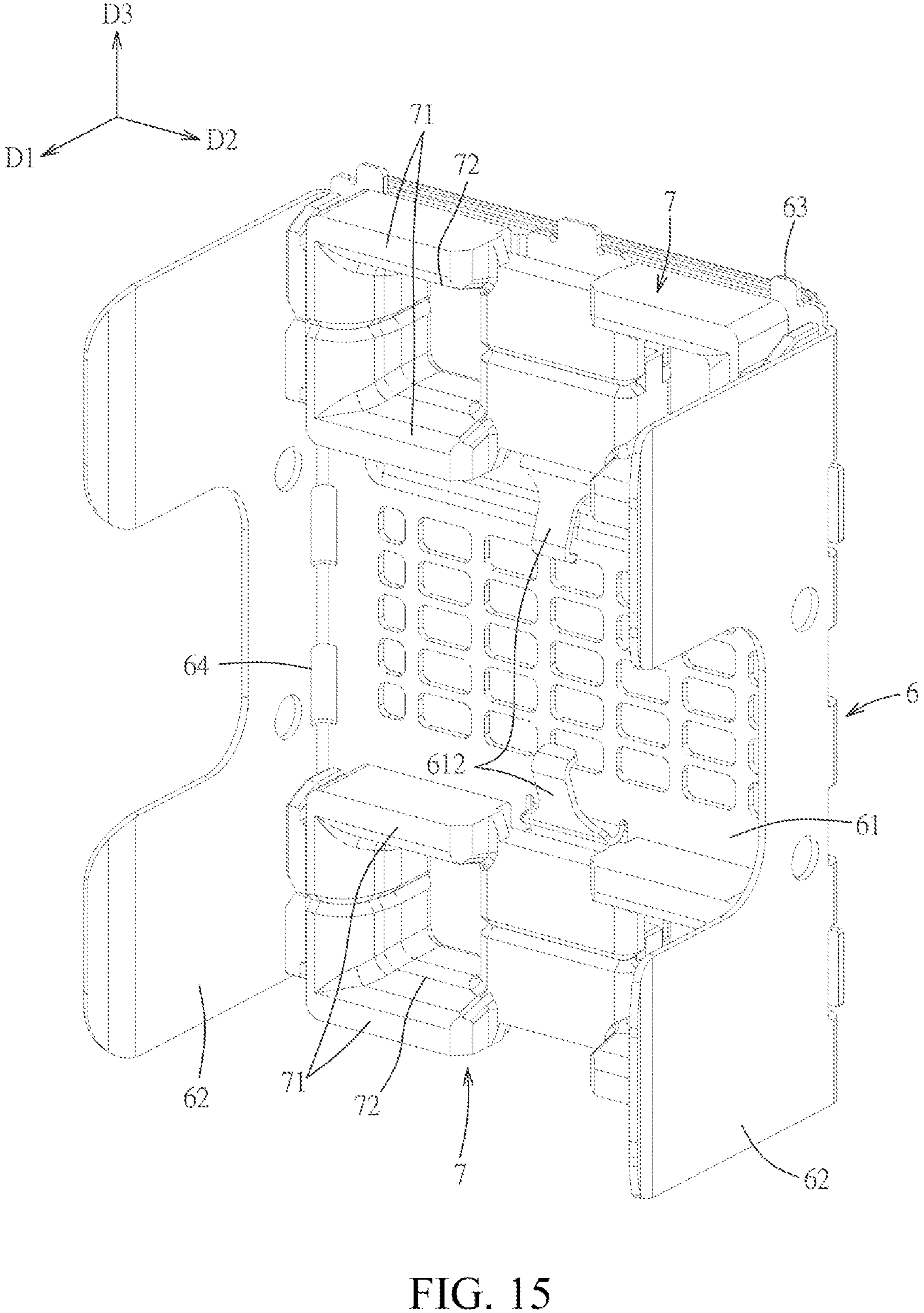
FIG. 15 is a three-dimensional view of a rear cover and wire organizers in the example.

Referring to FIG. 6 and FIG. 15, in addition, in the present example, the rear wall 61 of the rear cover 6 further has two pressure applying elastic members 612 integrally formed and applying forward pressure on the rear ends of the two socket housings 21 of the socket connector 2. The two pressure applying elastic members 612 enable the installation position of the socket connector 2 to be better determined. In detail, the pressure applying elastic member 612 is an elastic member structure cut out from the rear wall 61 and reversely folded forward.

Based on the above, in the present invention, the support structure 127 of the compartment frame 12 provides support between the two socket housings 21, and includes the support block 127*c* disposed between the upper support plate 127*a* and the lower support plate 127*b*, thereby providing solid and strong support between the two socket housings 21. Secondly, the bolt 3 passing through the two socket housings 21 and the support structure 127 can further maintain the relative position between the two socket housings 21 and the support structure 127, so as to increase the support strength of the support structure 127, and the bolt 3 can further serve as a component for grounding. In addition, the wire organizers 7 installed on the rear cover 6 allow the plurality of cables 24 to come out from behind, and realizes wire organizing and positioning functions. Also, the wire organizer 7 formed by combining the two half portions 71 can be separately and easily installed onto the rear cover 6 when the cables 24 are in an assembled state. In addition, the wire organizer 7 can be made of an insulating material, so that the edges of the wire organizing holes 72 of the wire organizer 7 are not as sharp as the rear cover 6, thereby protecting the cables 24 coming out of the rear cover 6 from being scratched.

However, the above descriptions are merely examples of the present invention, which should not limit the scope of implementation of the present invention. Any simple equivalent changes and modifications made according to the claims of the present invention shall still fall within the scope of the present invention patent.

The invention claimed is:

1. A connector assembly, comprising:

a shielding cover comprising a cover body, a compartment frame positioned in the cover body, and two insertion channels jointly defined by the cover body and the compartment frame and separated by the compartment frame in an up-down direction; and a socket connector positioned at a rear segment of the shielding cover, the socket connector comprising two socket housings arranged in the up-down direction and respectively disposed at the two insertion channels, and a plurality of socket terminals;

wherein the compartment frame has a support structure located at the rear segment and provides support between the two socket housings, the support structure comprises an upper support plate, a lower support plate, and a support block disposed between the upper support plate and the lower support plate.

2. The connector assembly according to claim 1, wherein:

the compartment frame has an intermediate recess located at the rear segment and extending in a front-rear direction, the support structure further comprises two support structures separated by the intermediate recess in a left-right direction, the socket connector further comprises an intermediate housing disposed between the two socket housings and at least partially accommodated in the intermediate recess, the two socket housings and the intermediate housing jointly define two channels located on left and right sides of the intermediate housing, and the two support structures of the compartment frame are located at the two channels respectively.

3. The connector assembly according to claim 2, wherein each of the upper support plate and the lower support plate has a plurality of positioning protrusions located around the support block and used to position the support block.

4. The connector assembly according to claim 1, further comprising a bolt passing through the two socket housings of the socket connector and the support structure.

5. The connector assembly according to claim 4, wherein the bolt has a tail portion fixed to a circuit substrate.

6. The connector assembly according to claim 5, wherein the bolt is connected to a ground component of the socket connector and a ground line of the circuit substrate.

7. A connector assembly, comprising:

a shielding cover comprising a cover body, a compartment frame, and at least one insertion channel having a rear opening;

a socket connector positioned at a rear segment of the shielding cover, the socket connector comprising two socket housings, a plurality of socket terminals, and a plurality of cables respectively connected to at least part of the plurality of socket terminals and extending backward out of the rear opening;

a rear cover installed at the rear opening of the shielding cover, the rear cover comprising a rear wall, and the rear wall having a wire organizer installation portion; and a wire organizer installed at the wire organizer installation portion of the rear wall, the wire organizer having a plurality of wire organizing holes, and the plurality of cables of the socket connector extending through the plurality of wire organizing holes of the wire organizer;

wherein the compartment frame has a support structure that provides support between the two socket housings, and the support structure comprises an upper support plate, a lower support plate, and a support block disposed between the upper support plate and the lower support plate.

8. The connector assembly according to claim 7, wherein the wire organizer has two half portions combined with each other.

9. The connector assembly according to claim 8, wherein the two half portions of the wire organizer have the same configuration and are combinable with each other.

10. The connector assembly according to claim 7, wherein the wire organizer installation portion comprises a recess integrally formed at the rear wall, and the wire organizer is installed within the recess.

11. The connector assembly according to claim 10, wherein each of the half portions has a slot formed at a periphery thereof and correspondingly accommodating an edge of the recess.

12. The connector assembly according to claim 11, wherein each of the half portions has a plurality of combination protruding portions and a plurality of combination recessed portions complementary to each other.

13. The connector assembly according to claim 11, wherein the wire organizer installation portion comprises two recesses integrally formed at the rear wall and arranged side by side with each other, and a spacer member located between the two recesses, each of the half portions has two side portions respectively installed within the two recesses, and a spacer portion located between the two side portions and having a through-slot, and the spacer member is inserted in the through-slots of the spacer portions of the two half portions.

14. The connector assembly according to claim 13, wherein each of the half portions has a plurality of combination protruding portions and a plurality of combination recessed portions formed on the side portions and the spacer portion.

15. The connector assembly according to claim 13, wherein the connector assembly comprises two of the wire organizers, the rear wall has two of the wire organizer installation portions respectively located above and below and respectively having one of the wire organizers installed thereon, each of the recesses of the wire organizer installation portion located above has an upward-facing opening and each of the recesses of the wire organizer installation portion located below has a downward-facing opening.

* * * * *